(12) United States Patent
Chew et al.

(10) Patent No.: US 8,290,961 B2
(45) Date of Patent: Oct. 16, 2012

(54) TECHNIQUE FOR INFORMATION RETRIEVAL USING ENHANCED LATENT SEMANTIC ANALYSIS GENERATING RANK APPROXIMATION MATRIX BY FACTORIZING THE WEIGHTED MORPHEME-BY-DOCUMENT MATRIX

(75) Inventors: Peter A. Chew, Albuquerque, NM (US); Brett W. Bader, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 423 days.

(21) Appl. No.: 12/352,621

(22) Filed: Jan. 13, 2009

(65) Prior Publication Data

US 2010/0185685 A1 Jul. 22, 2010

(51) Int. Cl.
*G06F 17/30* (2006.01)
*G06F 17/20* (2006.01)
*G06F 17/21* (2006.01)

(52) U.S. Cl. ........ 707/748; 707/721; 707/723; 707/727; 707/730; 704/1; 704/10

(58) Field of Classification Search .......... 707/687–688, 707/693, 705–711, 741–750, 755, 810, 721–731; 715/203–209, 233–237, 239, 242, 259, 260, 715/264–265, 762; 704/1, 7–10
See application file for complete search history.

(56) References Cited

U.S. PATENT DOCUMENTS

| | | | | |
|---|---|---|---|---|
| 5,075,851 A | * | 12/1991 | Kugimiya et al. ............... 704/6 |
| 6,189,002 B1 | * | 2/2001 | Roitblat ............................... 1/1 |
| 6,415,250 B1 | * | 7/2002 | van den Akker .................. 704/9 |
| 6,675,159 B1 | * | 1/2004 | Lin et al. ............................ 1/1 |
| 6,766,316 B2 | * | 7/2004 | Caudill et al. ..................... 1/1 |
| 6,847,966 B1 | * | 1/2005 | Sommer et al. ................ 707/739 |
| 6,922,715 B2 | * | 7/2005 | Kobayashi et al. ............ 708/520 |
| 6,996,575 B2 | * | 2/2006 | Cox et al. ...................... 707/739 |
| 2003/0009324 A1 | * | 1/2003 | Alpha ............................... 704/9 |
| 2004/0111408 A1 | * | 6/2004 | Caudill et al. .................... 707/3 |
| 2004/0122656 A1 | * | 6/2004 | Abir ................................. 704/4 |

(Continued)

FOREIGN PATENT DOCUMENTS

WO WO 98/58344 * 12/1998

(Continued)

OTHER PUBLICATIONS

Karl-Michael Schneider, "Weighted Average Pointwise Mutual Information for Feature Selection in Text Categorization", Knowledge Discovery in Databases: PKDD 2005 (2005), pp. 252-263.*

(Continued)

*Primary Examiner* — Srirama Channavajjala
(74) *Attorney, Agent, or Firm* — Cory G. Claassen

(57) ABSTRACT

A technique for information retrieval includes parsing a corpus to identify a number of wordform instances within each document of the corpus. A weighted morpheme-by-document matrix is generated based at least in part on the number of wordform instances within each document of the corpus and based at least in part on a weighting function. The weighted morpheme-by-document matrix separately enumerates instances of stems and affixes. Additionally or alternatively, a term-by-term alignment matrix may be generated based at least in part on the number of wordform instances within each document of the corpus. At least one lower rank approximation matrix is generated by factorizing the weighted morpheme-by-document matrix and/or the term-by-term alignment matrix.

26 Claims, 11 Drawing Sheets

U.S. PATENT DOCUMENTS

| | | | |
|---|---|---|---|
| 2005/0091209 A1* | 4/2005 | Frank et al. | 707/3 |
| 2005/0203900 A1* | 9/2005 | Nakamura et al. | 707/5 |
| 2005/0240394 A1* | 10/2005 | Oda | 704/9 |
| 2006/0059144 A1* | 3/2006 | Canright et al. | 707/5 |
| 2006/0229865 A1* | 10/2006 | Carlgren et al. | 704/8 |
| 2007/0150260 A1* | 6/2007 | Lee et al. | 704/2 |
| 2009/0070101 A1* | 3/2009 | Masuyama et al. | 704/9 |
| 2010/0211567 A1* | 8/2010 | Abir | 707/730 |

FOREIGN PATENT DOCUMENTS

| | | |
|---|---|---|
| WO | WO 2006/130985 | * 12/2006 |
| WO | WO 2006/138270 | * 12/2006 |

OTHER PUBLICATIONS

Teruko Mitamura, et al. "JAVELIN III: Cross-Lingual Question Answering from Japanese and Chinese Documents",Proceedings of NTCIR-6 Workshop Meeting, May 15-18, 2007, Tokyo, Japan, pp. 202-209.*

Hélène Giraudo et al "Lexeme-Based Model vs. Morpheme-Based Model from Psycholinguistic Perspectives", 2007 Hélène Giraudo and Madeleine Voga-Redlinger. Selected Proceedings of the 5th Décembrettes: Morphology in Toulouse, ed. Fabio Montermini, Gilles Boyé, and Nabil Hathout, 108-114. Somerville, MA: Cascadilla Proceedings Project.*

Michael W. Berry et al. "Document Classification Using Nonnegative Matrix Factorization and Underapproximation", IEEE 2009, pp. 2782-2785.*

Yejun Xu,A Method for Multiple Attribute Decision Making with Incomplete Weight Information under Uncertain Linguistic Preference Relations ,Proceedings of 2007 IEEE International Conference on Grey Systems and Intelligent Services, Nov. 18-20, 2007, pp. 768-773.*

Bader, Brett W. et al., "Survey of Text Mining: Clustering Classification, and Retrieval" (2nd Edition), Chapter 8: Discussion Tracking in Enron Email Using PARAFAC, 2008, pp. 147-163, Springer-Verlag, New York.

Bader, Brett W. et al., "Enhancing Multilingual Latent Semantic Analysis with Term Alignment Information", Proceedings of the $22^{nd}$ International Conference on Computational Linguistics (COLING 2008), Aug. 2008, pp. 49-56, Manchester, England. http://www.aclweb.org/anthology-new/C/C08/C08-1007.pdf.

Bader, Brett W. et al., "Text Mining: Theory, Application, and Visualization", Chapter 1: "Nonnegative Matrix and Tensor Factorization for Discussion Tracking", 2009, 32 pages, Chapman and Hall/CRC.

Baeza-Yates, Ricardo et al., "Modern Information Retrieval", 1999, 37 pages, ACM Press, New York, NY.

Berry, Michael W. et al., "Using Linear Algebra for Intelligent Information Retrieval", SIAM: Review 37, Dec. 1994, pp. 573-595. http://lsirwww.epfl.ch/courses/dis/2003ws/papers/ut-cs-94-270.pdf.

Biola University, "The Unbound Bible", http://www.unboundbible.org/, (Retrieved from Internet Jan. 29, 2008), 2005-2006.

Boyack, Kevin W. et al., "Mapping the backbone of science", Scientometrics vol. 64, No. 3, 2005, pp. 351-374, http://ivl.slis.indiana.edu/km/pub/2005-boyack-mapbckbn.pdf.

Broe, Michael, "A Generalized Information-Theoretic Measure for Systems of Phonological Classification and Recognition", Proceedings of the Second Meeting of the ACL Special Interest Group in Computational Phonology, pp. 17-24, Department of Linguistics, Northwestern University, Evanston, IL.

Brown, Peter F. et al., "Class-Based n-gram Models of Natural Language", Associate for Computational Linguistics, vol. 18, No. 4, 1992, pp. 467-479, http://acl.ldc.upenn.edu/J/j92/J92-4003.pdf.

Brown, Peter F. et al., "The Mathematics of Statistical Machine Translation: Parameter Estimation", Associate for Computational Linguistics, vol. 19, No. 2, 1993, pp. 263-311, http://acl.ldc.upenn.edu/j/j93/j93-2003.pdf.

Cherry, E. Colin et al, "Toward the Logical Description of Languages in their Phonemic Aspect", Language 29: 34-46, 1953, http://hum.uchicago.edu/~jagoldsm/Webpage/Courses/HistoryOfPhonology/CherryHalleJakobson.pdf.

Chew, Peter A. et al., "Benefits of the 'Massively Parallel Rosetta Stone': Cross-Language Information Retrieval with over 30 Languages", Proceedings of the $45^{th}$ International Conference on Computational Linguistics (COLING 2007), Jun. 2007, pp. 872-879, Prague, Czech Republic. http://acl.ldc.upenn.edu/P/P07/P07-1110.pdf.

Chew, Peter A. et al., "Cross-Language Information Retrieval Using PARAFAC2", Proceedings of the Conference on Knowledge Discovery and Data Mining, Sandia Report, Sand2007-2706, May 2007, 12 pages, Sandia National Laboratories, Albuquerque, New Mexico, http://csmr.ca.sandia.gov/~tgkolda/pubs/bibtgkfiles/SAND2007-2706.pdf.

Chew, Peter A. et al., "The Knowledge of Good and Evil: Multilingual Ideology Classification with PARAFAC2 and Machine Learning", Language Forum 34, 2008, pp. 37-52.

Chisholm, Erica et al., "New Term Weighting Formulas for the Vector Space Method In Information Retrieval", Oak Ridge National Laboratory Technical Report ORNL/TM-13756, Mar. 1999, 20 pages, Oak Ridge, Tennessee, http://csmr.ca.sandia.gov/~tgkolda/pubs/bibtgkfiles/ornl-tm-13756.pdf.

Chomsky, Noam, "Three Models for the Description of Language. IRE Transactions on Information Theory 2", 1956, pp. 113-124, http://ieeexplore.ieee.org/stamp/stamp.jsp?arnumber=10568138&isnumber=22738.

Chomsky, Noam, "Syntactic Structures", 1957, Mouton Publishing, The Hague, NL.

Chomsky, Noam, "On Certain Formal Properties of Grammars. Information and Control 2", 1959, pp. 137-157.

Chomsky, Noam, "Aspects of the Theory of Syntax", 1965, MIT Press, Cambridge, MA.

Chomsky, Noam et al., "The Sound Pattern of English", Harper and Row, New York, http://www.ling.umd.edu/~idsardi/Features/SPE7.pdf.

Deerwester, Scott et al., "Indexing by Latent Semantic Analysis", Journal of the American Society for Information Science 41:6, 1990, pp. 391-407, http://lyle.smu.edu/~mhd/8337sp07/deerwester.pdf.

Dumais, Susan T, "Improving the Retrieval of Information from External Sources. Behavior Research Methods", Behavior Research Methods, Instruments, and Computers 23, 1991, pp. 229-236, http://www.psychonomic.org/search/view.cgi?id=5145.

Ekcart, Carl et al., "The approximation of one matrix by another of lower rank", Psychometrika vol. 1, No. 3, 1936, pp. 211-218, Springer, New York.

Goldsmith, John, "Unsupervised Learning of the Morphology of a Natural Language", Association of Computational Linguistics 27 (2), 2001, pp. 153-198.

Golub, Gene H. et al., "Matrix Computations", Third Edition, 1996, Johns Hopkins University Press, Baltimore, MD.

Halle, Morris, "The Sound Pattern of Russian", 1959, Mouton and Co.

Harshman, Richard A., "PARAFAC2: Mathematical and Technical Notes. UCLA Working Papers in Phonetics", 1972, pp. 30-47, http://publish.uwo.ca/~harshman/wpppfac2.pdf.

Hendrickson, Bruce, "Latent Semantic Analysis and Fiedler Retrieval", Sep. 21, 2006, 12 pages, http://www.sandia.gov/~bahendr/papers/Fiedler-LSA.pdf.

Hockett, Charles F., "A Course in Modern Linguistics", 1958, Macmillan Publishing Company, Inc.

Koehn, Philipp et al., "Europarl: a Multilingual Corpus for Evaluation of Machine Translation", Dec. 28, 2002, 18 pages, Information Science Institute, University of Southern California, Marina del Ray, California, http://www.iccs.inf.ed.ac.uk/~pkoehn/publications/europarl.pdf.

Koehn, Philipp et al., "Statistical Phrase-Based Translation", Proceedings of the Joint Conference on Human Language Technologies and the Annual Meeting of the North American Chapter of the Association of Computational Linguistics (HLT/NAACL), May-Jun. 2003, pp. 48-54, http://acl.ldc.upenn.edu/N/N03/N03-1017.pdf.

Landauer, Thomas K. et al., "An Introduction to Latent Semantic Analysis", 1998, 41 pages, http://mainline.brynmawr.edu/Courses/cs380/fall2006/intro_to_LSA.pdf.

Louvins, Julie Beth, "Development of a Stemming Algorithm", Mechanical Translation and Computational Linguistics vol. 11, 1968, pp. 22-31, Massachusetts Institute of Technology, Cambridge, MA.

Matveeva, Irina et al., "Term Representation with Generalized Latent Semantic Analysis", 2005, 8 pages, http://people.cs.uchicago.edu/~matveeva/SynGLSA_ranlp_final.pdf.

Miller, George A. et al., "Finitary Models of Language Users", Handbook of Mathematical Psychology, vol. II, 1963, pp. 419-491, John Wiley and Sons, Inc., New York.

Moore, Gordon E., "Cramming More Components onto Integrated Circuits", Electronics, vol. 38, No. 8, Apr. 19, 1965, 4 pages.

Pereria, Fernando, "Formal grammar and information theory: Together again?", Philosophical Transactions of the Royal Society of London, A 358: pp. 1239-1253, http://www.cis.upenn.edu/~pereira/papers/rsoc.pdf.

Resnik, Phillip et al., "The Bible as a Parallel Corpus: Annotating the "Book of 2000 Tongues"".

Shannon, C.E., "A Mathematical Theory of Communication", The Bell System Technical Journal, vol. 27, 1948, pp. 379-423 and 623-656, http://cnscenter.future.co.kr/resource/crypto/algorithm/block/shannon1948.pdf.

Sinkhorn, Richard, "A Relation Between Arbitrary Positive Matrices and Doubly Stochastic Matrices", Annals of Mathematical Statistics, vol. 35, No. 2, 1964, pp. 876-879, http://projecteuelid.org/DPubS?service=UI&version=1.0&verb=Display&handle=euclid.aoms/1177703591.

Jones, Karen S., A Statistical Interpretation of Term Specificity and its Applications to Retrieval, Journal of Documentation, vol. 28, 1972, pp. 11-21.

Tomlinson, Stephen, "Finnish, Portuguese and Russian Retrieval with Hummingbird SearchServerTM at CLEF 2004", Aug. 16, 2004, 10 pages.

Tucker, Ledyard R., "Some Mathematical Notes on Three-mode Factor Analysis", Psychometrika, vol. 31, No. 3, Sep. 1966, pp. 279-311.

Weaver, Warren, "Translation", In Machine Translation of Languages, 1949, 6 pages, MIT Press.

Young, Paul G., "Cross Language Information Retrieval Using Latent Semantic Indexing", Master's Thesis, Oct. 1994, 57 pages, University of Knoxville, Tennessee, Knoxville, TN.

Zhou, Ding et al., "Co-Ranking Authors and Documents in a Heterogeneous Network", Seventh IEEE International Conference on Data Mining, 2007, pp. 739-744, http://clgiles.ist.psu.edu/papers/ICDM2007-corank-hetero-networks_long.pdf.

* cited by examiner

TERM-BY-DOCUMENT MATRIX (GENERICALLY)
OR
WORDFORM-BY-DOCUMENT MATRIX (SPECIFICALLY)

| Term | Document 1 'the man walked the dog' | Document 2 'the man carried the dog to the park' | Document 3 'the dog walks to the park' | Total |
|---|---|---|---|---|
| the | 2 | 3 | 2 | 7 |
| man | 1 | 1 | 0 | 2 |
| walked | 1 | 0 | 0 | 1 |
| dog | 1 | 1 | 1 | 3 |
| carried | 0 | 1 | 0 | 1 |
| to | 0 | 1 | 1 | 2 |
| park | 0 | 1 | 1 | 2 |
| walks | 0 | 0 | 1 | 1 |
| Total | 5 | 8 | 6 | 19 |

|  | PMI weighting | | | Log-entropy weighting | | |
|---|---|---|---|---|---|---|
| Term | Doc1 | Doc2 | Doc3 | Doc1 | Doc2 | Doc3 |
| the | 0.119 | 0.026 | -0.144 | 0.028 | 0.036 | 0.028 |
| man | 0.926 | 0.248 |  | 0.369 | 0.369 |  |
| walked | 1.926 |  |  | 1.000 |  |  |
| dog | 0.341 | -0.337 | 0.078 | 0 | 0 | 0 |
| carried |  | 1.248 |  |  | 1.000 |  |
| to |  | 0.248 | 0.663 |  | 0.369 | 0.369 |
| park |  | 0.248 | 0.663 |  | 0.369 | 0.369 |
| walks |  |  | 1.663 |  |  | 1.000 |

FIG. 2

MORPHEME-BY-DOCUMENT MATRIX

| Term | Document 1 'the man walked the dog' | Document 2 'the man carried the dog to the park' | Document 3 'the dog walks to the park' | Total |
|---|---|---|---|---|
| the | 2 | 3 | 2 | 7 |
| man | 1 | 1 | 0 | 2 |
| walk | 1 | 0 | 1 | 2 |
| ed | 1 | 1 | 0 | 2 |
| dog | 1 | 1 | 1 | 3 |
| carri | 0 | 1 | 0 | 1 |
| to | 0 | 1 | 1 | 2 |
| park | 0 | 1 | 1 | 2 |
| s | 0 | 0 | 1 | 1 |
| Total | 6 | 9 | 7 | 22 |

FIG. 3

SPARSE TERM-BY-TERM ALIGNMENT MATRIX

|  | the | poor | don't | have | any | money | les | pauvres | sont | demunis |
|---|---|---|---|---|---|---|---|---|---|---|
| the | X |  |  |  |  |  | X |  |  |  |
| poor |  | X |  |  |  |  |  | X |  |  |
| don't |  |  | X |  |  |  |  |  | X | X |
| have |  |  |  | X |  |  |  |  | X | X |
| any |  |  |  |  | X |  |  |  | X | X |
| money |  |  |  |  |  | X |  |  | X | X |
| les | X |  |  |  |  |  | X |  |  |  |
| pauvres |  | X |  |  |  |  |  | X |  |  |
| sont |  |  | X | X | X | X |  |  | X |  |
| demunis |  |  | X | X | X | X |  |  |  | X |

DENSE TERM-BY-TERM ALIGNMENT MATRIX                                       600

| | the | poor | don't | have | any | money | les | pauvres | sont | demunis |
|---|---|---|---|---|---|---|---|---|---|---|
| the | X | X | X | X | X | X | X | X | X | X |
| poor | X | X | X | X | X | X | X | X | X | X |
| don't | X | X | X | X | X | X | X | X | X | X |
| have | X | X | X | X | X | X | X | X | X | X |
| any | X | X | X | X | X | X | X | X | X | X |
| money | X | X | X | X | X | X | X | X | X | X |
| les | X | X | X | X | X | X | X | X | X | X |
| pauvres | X | X | X | X | X | X | X | X | X | X |
| sont | X | X | X | X | X | X | X | X | X | X |
| demunis | X | X | X | X | X | X | X | X | X | X |

FIG. 6

$$I(A;B) = \sum_{b \in B} \sum_{a \in A} p(a,b) \log\left(\frac{p(a,b)}{p(a)p(b)}\right)$$

Equation 5

$$I(A;B) = H(A) + H(B) - H(A,B)$$

Equation 6

$$I(A;B) = \left(\frac{r+s}{N}\log\frac{r+s}{N} + \frac{t+u}{N}\log\frac{t+u}{N}\right) + \left(\frac{r+t}{N}\log\frac{r+t}{N} + \frac{s+u}{N}\log\frac{s+u}{N}\right) - \left(\frac{r}{N}\log\frac{r}{N} + \frac{s}{N}\log\frac{s}{N} + \frac{t}{N}\log\frac{t}{N} + \frac{u}{N}\log\frac{u}{N}\right)$$

Equation 7

FIG. 7

DENSE TERM-BY-TERM ALIGNMENT MATRIX            800

| | the | poor | have | any | money | les | pauvres | sont |
|---|---|---|---|---|---|---|---|---|
| the | $8.22 \times 10^{-1}$ | $1.51 \times 10^{-4}$ | $7.59 \times 10^{-4}$ | $1.01 \times 10^{-5}$ | $4.84 \times 10^{-5}$ | $5.92 \times 10^{-2}$ | $6.02 \times 10^{-4}$ | $6.90 \times 10^{-4}$ |
| poor | $1.51 \times 10^{-4}$ | $5.02 \times 10^{-2}$ | $7.48 \times 10^{-5}$ | $2.78 \times 10^{-7}$ | $2.67 \times 10^{-6}$ | $1.57 \times 10^{-5}$ | $1.03 \times 10^{-2}$ | $3.92 \times 10^{-6}$ |
| have | $7.59 \times 10^{-4}$ | $7.48 \times 10^{-5}$ | $4.51 \times 10^{-1}$ | $4.05 \times 10^{-4}$ | $2.19 \times 10^{-5}$ | $9.53 \times 10^{-6}$ | $1.42 \times 10^{-4}$ | $2.25 \times 10^{-3}$ |
| any | $1.01 \times 10^{-5}$ | $2.78 \times 10^{-7}$ | $4.05 \times 10^{-4}$ | $1.05 \times 10^{-1}$ | $7.32 \times 10^{-5}$ | $2.92 \times 10^{-6}$ | $3.60 \times 10^{-6}$ | $2.42 \times 10^{-5}$ |
| money | $4.84 \times 10^{-5}$ | $2.67 \times 10^{-6}$ | $2.19 \times 10^{-5}$ | $7.32 \times 10^{-5}$ | $3.74 \times 10^{-2}$ | $1.07 \times 10^{-6}$ | $1.23 \times 10^{-5}$ | $6.49 \times 10^{-5}$ |
| les | $5.92 \times 10^{-2}$ | $1.57 \times 10^{-5}$ | $9.53 \times 10^{-6}$ | $2.92 \times 10^{-6}$ | $1.07 \times 10^{-6}$ | $9.25 \times 10^{-1}$ | $2.54 \times 10^{-4}$ | $1.32 \times 10^{-2}$ |
| pauvres | $6.02 \times 10^{-4}$ | $1.03 \times 10^{-2}$ | $1.42 \times 10^{-4}$ | $3.60 \times 10^{-6}$ | $1.23 \times 10^{-5}$ | $2.54 \times 10^{-4}$ | $2.21 \times 10^{-2}$ | $1.78 \times 10^{-6}$ |
| sont | $6.90 \times 10^{-4}$ | $3.92 \times 10^{-6}$ | $2.25 \times 10^{-3}$ | $2.42 \times 10^{-5}$ | $6.49 \times 10^{-5}$ | $1.32 \times 10^{-2}$ | $1.78 \times 10^{-6}$ | $3.51 \times 10^{-1}$ |

FIG. 8

SVD OF WEIGHTED MORPHEME-BY-DOC MATRIX $$X = U \cdot S \cdot V^T$$

WEIGHTED MORPHEME-BY-DOC MATRIX (X)

|        | DOCUMENT 1 | DOCUMENT 2 | DOCUMENT 3 |
|--------|------------|------------|------------|
| THE    | 0.07       | 0.07       | -0.2       |
| MAN    | 0.87       | 0.29       |            |
| WALK   | 0.87       |            | 0.65       |
| DOG    | 0.29       | -0.3       | 0.07       |
| CARRI  |            | 1.29       |            |
| TO     |            | 0.29       | 0.65       |
| PARK   |            | 0.29       | 0.65       |
| ED     | 0.87       | 0.29       |            |
| S      |            |            | 1.65       |

=

MORPHEME-BY-CONCEPT MATRIX (U)

|        | CONCEPT 1 | CONCEPT 2 | CONCEPT 3 |
|--------|-----------|-----------|-----------|
| THE    | 0.05      | -0.1      | 0.01      |
| MAN    | -0.2      | -0.5      | -0.2      |
| WALK   | -0.4      | -0.3      | -0.4      |
| DOG    | -0        | -0        | -0.3      |
| CARRI  | -0.1      | -0.5      | 0.77      |
| TO     | -0.3      | 0.06      | 0.19      |
| PARK   | -0.3      | 0.06      | 0.19      |
| ED     | -0.2      | -0.5      | -0.2      |
| S      | -0.7      | 0.41      | 0.04      |

·

SINGULAR VALUES MATRIX (S)

| 2.08 |      |      |
|------|------|------|
|      | 1.55 |      |
|      |      | 1.34 |

·

DOC-BY-CONCEPT MATRIX ($V^T$)

|           | DOCUMENT 1 | DOCUMENT 2 | DOCUMENT 3 |
|-----------|------------|------------|------------|
| CONCEPT 1 | -0.3       | -0.7       | -0.6       |
| CONCEPT 2 | -0.2       | -0.6       | 0.8        |
| CONCEPT 3 | -0.9       | 0.38       | 0.03       |

EVD BLOCK MATRIX EQUIVALENT $$B_1 = \begin{bmatrix} 0 & X \\ X^T & 0 \end{bmatrix}$$

FIG. 11

EVD OF WEIGHTED TERM-BY-TERM MATRIX

WEIGHTED TERM-BY-TERM ALIGNMENT MATRIX (D1)

|  | THE | MAN | WALK | DOG | CARRI | TO | PARK | ED | S |
|---|---|---|---|---|---|---|---|---|---|
| THE | 0 | 0 | 0 | 0 | 0 | 0 | 0 | 0 | 0 |
| MAN | 0 | 0.92 | 0.25 | 0 | 0.25 | 0.25 | 0.25 | 0.92 | 0.92 |
| WALK | 0 | 0.25 | 0.92 | 0 | 0.25 | 0.25 | 0.25 | 0.25 | 0.25 |
| DOG | 0 | 0 | 0 | 0 | 0 | 0 | 0 | 0 | 0 |
| CARRI | 0 | 0.25 | 0.25 | 0 | 0.92 | 0.25 | 0.25 | 0.25 | 0.25 |
| TO | 0 | 0.25 | 0.25 | 0 | 0.25 | 0.92 | 0.92 | 0.25 | 0.25 |
| PARK | 0 | 0.25 | 0.25 | 0 | 0.25 | 0.92 | 0.92 | 0.25 | 0.25 |
| ED | 0 | 0.92 | 0.25 | 0 | 0.25 | 0.25 | 0.25 | 0.92 | 0.92 |
| S | 0 | 0.92 | 0.25 | 0 | 0.25 | 0.25 | 0.25 | 0.92 | 0.92 |

EVD ⇒

MORPHEME-BY-CONCEPT MATRIX

|  | CONCEPT 1 | CONCEPT 2 | CONCEPT 3 |
|---|---|---|---|
| THE | 0.05 | -0.1 | 0.01 |
| MAN | -0.2 | -0.5 | -0.2 |
| WALK | -0.4 | -0.3 | -0.4 |
| DOG | -0 | -0 | -0.3 |
| CARRI | -0.1 | -0.5 | 0.77 |
| TO | -0.3 | 0.06 | 0.19 |
| PARK | -0.2 | 0.06 | 0.19 |
| ED | -0.2 | -0.5 | -0.2 |
| S | -0.7 | 0.41 | 0.04 |

(EIGENVECTORS)

&

(EIGENVALUES)

EVD BLOCK MATRIX EQUIVALENT $$B_2 = \begin{bmatrix} D1 & 0 \\ 0 & 0 \end{bmatrix}$$

TECHNIQUE FOR INFORMATION RETRIEVAL USING ENHANCED LATENT SEMANTIC ANALYSIS GENERATING RANK APPROXIMATION MATRIX BY FACTORIZING THE WEIGHTED MORPHEME-BY-DOCUMENT MATRIX

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to natural language processing, and in particular but not exclusively, relates to the application of latent semantic analysis and computational linguistic principles to information retrieval.

BACKGROUND INFORMATION

Despite many shared goals, the computational linguistics ("CL") and information retrieval ("IR") communities have remained somewhat separate with surprisingly little cross-fertilization between the two. There are a number of ways to explain the sociological divide. One community is theory-oriented while the other is engineering-oriented; or perhaps among computational linguists there is still some residue of Avram Noam Chomsky's (well known in the academic and scientific community as the father of modern linguistics) distrust of statistics-based approaches. Whatever the reasons for the divide, from the perspective of the IR community the insights of CL are in many respects an untapped resource. If this divide can be bridged, opportunities arise for subjecting standard tenets of IR to a critical re-evaluation based on what is know from CL, and from this, IR can benefit. Some of these CL insights may be found in a variety of areas, such as, morphology, translation, and semantics, to name a few. Proper consideration of Information Theory—integral to CL—may throw light on many different aspects of IR.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 2 is a table comparing a pointwise mutual information weighting scheme to a log-entropy weighting scheme, in accordance with an embodiment of the invention.

FIG. 3 is a morpheme-by-document matrix, in accordance with an embodiment of the invention.

FIG. 6 illustrates a dense term-by-term alignment matrix of a multilingual parallel corpus, in accordance with an embodiment of the invention.

FIG. 7 includes two equations for determining mutual information of a term-by-term alignment matrix, in accordance with an embodiment of the invention.

FIG. 8 illustrates a dense term-by-term alignment matrix having cells populated with numerical values generated using mutual information, in accordance with an embodiment of the invention.

FIG. 11 illustrates a singular value decomposition of a weighted morpheme-by-document matrix, in accordance with an embodiment of the invention.

DETAILED DESCRIPTION

Embodiments of a system and method for information retrieval using principles of latent semantic analysis and computational linguistics applied to unilingual and multilingual corpus are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "morpheme" is the smallest linguistic unit that has semantic meaning. A "stem" is the part of a word that is common to all its inflected variants. An "affix" is a morpheme that is attached to a stem to form a word and includes prefixes and suffixes. A "wordform" is the combination of a stem and any affixes. A "term" is generically and broadly defined herein to include within its definition any or all of a word, a stem, an affix, a morpheme, or a wordform. The "rank" of an m×n matrix is defined as min(m,n). A "corpus" is a set of two or more documents or texts. For example, the Bible may be considered a document. Alternatively, each book, chapter, or even verse in the Bible, either in a particular language or across multiple languages, may be considered a document.

Figure 1:
FIG. 1 illustrates a term-by-document matrix, also referred to as a wordform-by-document matrix, in accordance with an embodiment of the invention.

Most of information retrieval ("IR") dealing with text is based on the insight that terms and documents can be arranged into a matrix format, where each row stands for a term i, each column for a document j, and the numerical entry in cell (i, j) is the number of times i appears in j. This matrix is referred to as a term-by-document matrix. A term is any text delimited by non-word characters. The matrix thus formed says nothing about the ordering of terms in documents, which is why the approach is sometimes referred to as a 'bag-of-words' approach. FIG. 1 illustrates a demonstrative term-by-document matrix 100 having three documents (in the illustrated example each sentence is a defined as a document for simplicity of illustration) with a combined total of eight different terms.

The existence of a term-by-document matrix implies the existence of document vectors (the columns in the matrix) and term vectors (the rows). In the case of the document vectors, the terms can be thought of as unordered features or attributes, and the numerical entries in the vector, attribute-values. Similarly, the term vectors also have attributes (the documents) and attribute-values. In effect, a term is defined by the documents in which it occurs. In order to compute the similarity of a term to another term, or a document to another document, the cosine or angle between the two respective vectors may be determined. In practice, there are many transformations which are applied to term-by-document matrices and many uses to which they can be put, but the outline above holds broadly true for most text retrieval.

It should be appreciated that a term-by-document matrix having document vectors in columns and term vectors in rows can be implemented as a document-by-term matrix having document vectors in rows and term vectors in columns. While term-by-document matrices will be used throughout this document for consistency and ease of illustration, a term-by-document matrix can be implemented as a document-by-term matrix with appropriate alterations to the applicable linear algebra discussed below. As such, a term-by-document matrix is defined herein as including matrices having document vectors in columns and term vectors in rows and vice versa.

A common and usually effective method for improving retrieval performance is not to set (i, j) in the term-by-document matrix equal to the number of times i appears in j (the raw frequency), but rather to use a term weighting scheme. Terms are conventionally weighted according to a local and/or global weight. Conventional weightings are shown in Table 1.

TABLE 1

Weighting Schemes

Weighting schemes

| | |
|---|---|
| Local | L1: None, or term frequency (tf) |
| | L2: Binary |
| | L3: Log(term frequency + 1) |
| Global | G1: None |
| | G2: Normal |
| | G3: Global frequency - inverse document frequency (gfidf) |
| | G4: Inverse document frequency (idf) |
| | G5: Entropy |

The local and global weightings can, in principle, be combined together however one wishes, so with the options in Table 1, there are 15 possible combinations. When combined, the local weighted value is multiplied by the global weight: as an example, the expression for log-entropy weighting (L3-G5) is as follows:

$$w(i, j) = \log(f(i, j) + 1) \times \frac{\left(1 + \sum_j p(i, j)\log(p(i, j))\right)}{\log N} \quad \text{(Equation 1)}$$

$$\underbrace{\phantom{w(i,j)=\log(f(i,j)+1)}}_{\text{local weight}} \underbrace{\phantom{\frac{(1+\sum p(i,j)\log(p(i,j)))}{\log N}}}_{\text{global weight}}$$

where w(i,j) is the 'transformed' (or weighted) frequency of term i in document j, f(i,j) is the raw frequency, N is the number of documents in the corpus, and p(i,j) is the probability that a given occurrence of i is in document j, or f(i,j) divided by the total frequency of i in the corpus.

Log-entropy weighting is perhaps the most popular weighting scheme in use today. From an Information Theory ("IT") perspective, entropy is a measure of noise. In Equation 1 above, $$-\sum_j p(i, j)\log(p(i, j)))$$

is the element which expresses the term entropy. Here, the term is treated as a random variable with a probability distribution; the observed frequencies in the corpus allow us to estimate that probability distribution. Another way of thinking of entropy is as the total expected value of the log-probabilities. For a term which occurs with equal frequency (and therefore probability) in all N documents—an unlikely scenario in natural language—the entropy is equal to log(1/N) or −log(N), and it will be clear from Equation 1 that the global weight will be zero, as will w(i,j). For the hapax legomena, a word that appears once in a corpus, the entropy is zero and the global weight is 1.

In accordance with an embodiment of the invention, a pointwise mutual-information ("PMI") weighting is applied in place of the conventional log-entropy weighting described above. However, it should be appreciated that log-entropy weighting can still be used with embodiments of the invention, as described below in connection with FIG. 9.

With PMI weighting, the weighted frequency w(i,j) is simply the pointwise mutual information between the term i and the document j. To illustrate term-by-document matrix 100 is considered. PMI weighting treats each token (instance of a term) in the corpus as an event, and the terms and documents both as variables. The probability of a term p(i) is the probability that, given any token selected at random from the corpus, it is the term in question. Thus, based on term-by-document matrix 100, p('the') is 7/19, or about 0.368. Likewise, the probability of a document p(j) is the probability that a given token selected at random came from that document. For example, the probability of document 1 above is 5/19 or about 0.263. The joint probability p(i,j) is the probability that the randomly selected token both is the term i, and it came from j. Thus, p('the',doc1) here would be 2/19, or about 0.105. W(i,j) is assigned the pointwise mutual information of a term i and a document j, as follows:

$$w(i, j) = \log\left(\frac{p(i, j)}{p(i)p(j)}\right) \quad \text{(Equation 2)}$$

Equivalently, w(i,j) is log(P1/P2), where P1 is the probability of i occurring in j, and P2 is the probability of i occurring in the corpus as a whole. Note that w(i,j) is negative in cases where P1<P2, and is maximized when i occurs only in j. By using PMI weighting, dealing with separate local and global weights and the interaction between them is avoided.

FIG. 2 includes a table 200 comparing PMI weighting to log-entropy weighting for term-by-document matrix 200. The relative ordering of the terms between the two weighting schemes is similar, but, in contrast to PMI, log-entropy ranks 'the' higher than 'dog' in Doc1. To one's linguistic intuition, the ranking for Doc1 under mutual-information seems preferable to that under log-entropy. It also seems reasonable that 'dog' should have some weight, rather than the uniform weight of zero assigned by log-entropy. Empirical results have reinforced this intuitive evaluation.

Another advantage of PMI weighting over log-entropy weighting is that the former may likely be applicable not just to matrices (two way arrays) such as table 200 in FIG. 2, but also to tensors (n-way arrays). Adaptation of PMI weighting (see Equation 2 above) for more than two dimensions could be as shown in Equation 3 below.

$$w(i, j, k, \ldots) = \log\left(\frac{p(i, j, k, \ldots)}{p(i)p(j)p(k)\ldots}\right) \quad \text{(Equation 3)}$$

Referring back to FIG. 1, the terms in the rows of term-by-document matrix 100 were generated by simply parsing Doc1, Doc2, and Doc3 (the corpus) by assuming terms are delimited by non-word characters. Since the terms in the rows of term-by-document matrix 100 are obtained by parsing the corpus with the assumption that terms are delimited by non-word characters, term-by-document matrix 100 may be referred to as a "wordform-by-document" matrix. However, this approach has its shortcomings. Clearly, 'walked' and 'walks' are linguistically related. The common stem 'walk' is not one of the terms in term-by-document matrix 100, because nowhere in the corpus is the string 'walk' bounded by non-word characters. At the same time, term-by-document matrix 100 fails to encode the linguistic relationship between 'walks' and 'walked'; there is a row corresponding to each term, but the matrix would look no different (numerically) if 'walks' were replaced by 'runs'; accordingly, whether the term is 'walks' or 'runs' is essentially of no consequence in wordform-based IR.

This shortcoming is recognized and addressed to some degree by a standard technique in IR called stemming. There have been many variants on approaches to stemming, including using stem-lookup tables, suffix- or affix-stripping (requiring only tables of affixes), and lemmatization. Interestingly, many current approaches to stemming today are computationally quite complex and rule-driven, and may simultaneously involve the use of lookup tables. Therefore, these approaches tend to introduce an undesirable element of human supervised learning into the process. Furthermore, since both rules and lookup tables are generally developed by hand, there is clearly a cost associated with their use (although, if the rules or tables already exist, that cost may be a sunk cost). Regardless of how stemming is performed, the goal is almost always to reduce terms to a set of common stems: taking term-by-document matrix 100 as an example, the rows for 'walks' and 'walked' would be subsumed into a single row for 'walk', allowing a statistical similarity to emerge between Docs 1 and 3 where it would otherwise have been missed.

From a linguistic point of view, stemming is an improvement on no stemming, but it does not tell the whole story. With rows in term-by-document matrix 100 for only the stems (and not other morphological elements stripped away), the fact that documents 1 and 2 include the morpheme 'ed' (the past tense inflection) is not recognized. With regard to IT, 'ed' likely has a high entropy (low information content): the information in it is relatively unimportant compared to that of 'carry' or 'walk', but it is not completely insignificant, because the distinction between 'ed' and 's' is the only way the strings encode the fact that documents 1 and 2 are in the present tense, while document 3 is in the past tense. Consequently, embodiments of the invention use a morpheme-by-document matrix 300, illustrated in FIG. 3. In morpheme-by-document matrix 300, the stems are placed in separate rows from the prefixes and suffixes.

Figures 4, 5:
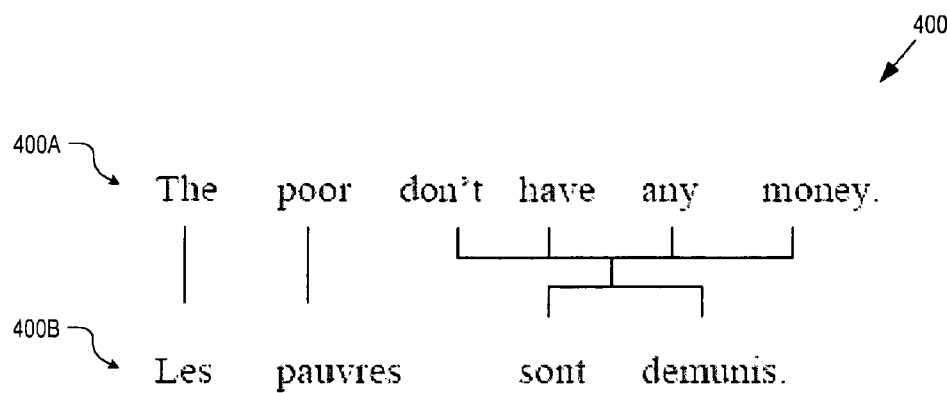
FIG. 4 illustrates a multilingual parallel corpus or part thereof, in accordance with an embodiment of the invention.
FIG. 5 illustrates a sparse term-by-term alignment matrix of a multilingual parallel corpus, in accordance with an embodiment of the invention.

In cases where IR is desired on a multilingual corpus, a special case term-by-term alignment matrix may be used, either in place of or together with a term-by-document matrix (e.g., wordform-by-document matrix 100 or morpheme-by-document matrix 300.) FIG. 4 illustrates an example multilingual parallel corpus 400 including an English language document 400A and a French language document 400B. Document 400B is a French translation of document 400A. A multilingual parallel corpus is a corpus containing foreign language groupings of documents where each group of documents is a foreign language translation of each other. The groupings may be simple pairs between two languages, as illustrated in FIG. 4, or may include translations of the same text into several different languages.

Assuming the translations of a multilingual parallel corpus are accurate, each English word will co-occur with a word (or words) in the foreign language document which translates it. However, one problem is that the same English word also co-occurs with many other foreign language words which are likely much more loosely semantically related (e.g., the only relationship being their existence in the same document). For example, the terms "don't have any money" in document 400A align with the terms "sont demunis" in document 400B, while "the" aligns with "les" and "poor" aligns with "pauvres." This alignment information can also be represented in a sparse term-by-term alignment matrix 500, illustrated in FIG. 5. In term-by-term alignment matrix 500, each entry 'X' denotes some non-zero correlation value. Since each term aligns with itself, the diagonal of the matrix is filled with non-zero values.

However, when every co-occurrence is considered, rather than just aligned occurrences as in the case of FIGS. 4 and 5, the term-by-term alignment matrix is not sparse, but rather may contain a non-zero entry for every term-term pair which co-occurs in the given documents. FIG. 6 illustrates an example dense term-by-term alignment matrix 600. To a linguist, sparse term-by-term alignment matrix 500 is a more accurate representation of the true situation than dense term-by-term alignment matrix 600 with co-occurrence values at every position in the alignment matrix. A sparse term-by-term alignment matrix may be computed empirically from a dense term-by-term alignment matrix, as described in connection with FIG. 8 below.

Supplying numerical values for X is now considered, in accordance with embodiments of the invention. When working with a parallel corpus, statistical machine translation ("SMT") offers a ready solution. The value of X at cell $(i_1, i_2)$ can be the mutual information of terms $i_1$ and $i_2$. Above, a weighting scheme for term-by-document matrix 100 is disclosed, which was also based on mutual information, but in that case the PMI of a term and document as events or outcomes was used. Here, by contrast, the mutual information is that of $i_1$ and $i_2$ as random binary variables. The mutual information I(A;B) of two variables A and B can be defined by Equation 5 (illustrated in FIG. 7). As should be clear by comparing Equations 2 and 5, the relationship of I(A;B) to PMI is that I(A;B) is equal to the expected value of the PMI of all possible outcomes a and b (just as entropy is the expected value of the log-probabilities). Equations 6 and 7 are equivalent to Equation 5 (illustrated in FIG. 7). In Equation 6, H(A) and H(B) are the respective entropies of A and B (comparable to term entropy in the log-entropy weighting scheme, but not quite identical because here A and B are treated as binary variables) and H(A,B) is the joint entropy of A and B. With respect to Equation 7, I(A;B) represents the mutual information of a term A and a term B, A represents the term A, B represents the term B, r represents a number of documents in the corpus that contain both the term A and the term B, s represents a number of documents in the corpus that contain the term A but not the term B, t represents a number of documents in the corpus that contain the term B but not the term A, u represents a number of documents in the corpus that contain neither the term B nor the term A, and N represents a total number of documents in the corpus. The log may be calculated in any base providing the same log is used consistently.

To elucidate further how this applies linguistically, suppose $i_1$ and $i_2$ are terms in a corpus. For each document, there are four possibilities: both occur, neither occur, only $i_1$ occurs, or only $i_2$ occurs. The distribution of documents according to these four categories can be represented in a 2×2 matrix. Clearly, mutual information should be maximized when the on-diagonal values are high and the off-diagonal values approach zero. This will generally be true for terms that are truly related to one another, such as 'poor' and 'pauvres' in corpus 400, and not for unrelated pairs such as 'poor' and 'sont'. We already stated that while all X in dense term-by-term alignment matrix 600 are non-zero, some X are larger than others. With measures of mutual information, dense term-by-term alignment matrix 600 can be populated with numerical values. FIG. 8 illustrates a dense term-by-term alignment matrix 800 using English and French translations of the Bible (here, the terms 'don't' and 'demunis' are ignored because they are absent from the parallel corpus).

When performing cross-language term alignment in SMT, each term is paired with its most related term in the other language by selecting the pairing that maximizes mutual information and discarding those that do not. The pairings that maximize mutual information (row-wise) are circled in FIG. 8. Dense term-by-term alignment matrix 800 can now be converted into a sparse term-by-term alignment matrix by setting all other entries to zero, which results in term-by-term alignment matrix 800 resembling sparse term-by-term alignment matrix 500 illustrated in FIG. 5. This square matrix can then be subjected to factorization to obtain lower rank approximation matrices (e.g., morpheme-by-concept matrix U or document-by-concept matrix $V^T$), as described below.

Figure 9:
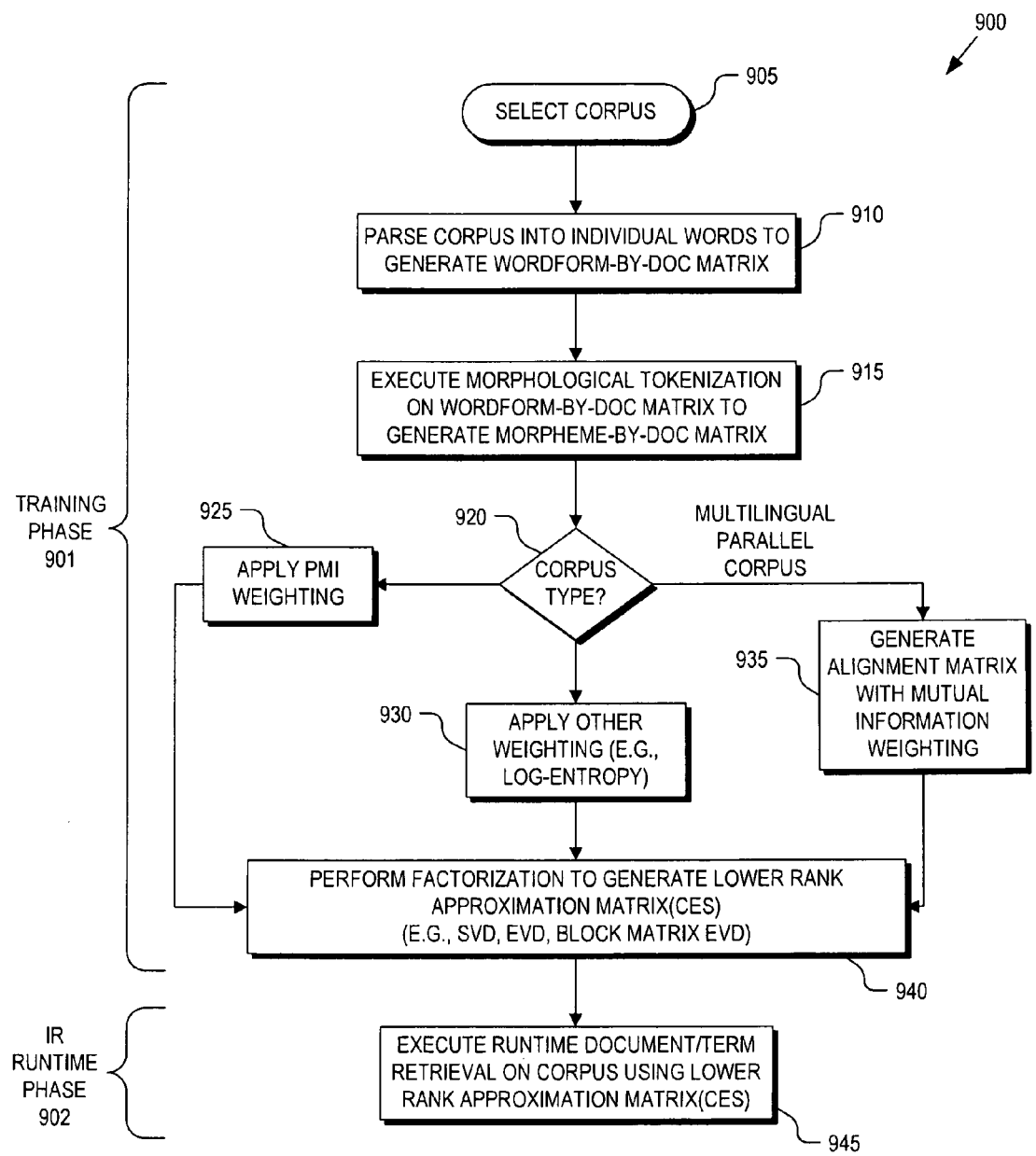
FIG. 9 is a flow chart illustrating a process of information retrieval, in accordance with an embodiment of the invention.

FIG. 9 is a flow chart illustrating a coherent process 900 of information retrieval building on the principles discussed above, in accordance with an embodiment of the invention. Process 900 is described with reference to FIGS. 10-13. The order in which some or all of the process blocks appear in process 900 should not be deemed limiting. Rather, one of ordinary skill in the art having the benefit of the present disclosure will understand that some of the process blocks may be executed in a variety of orders not illustrated.

Figure 10:
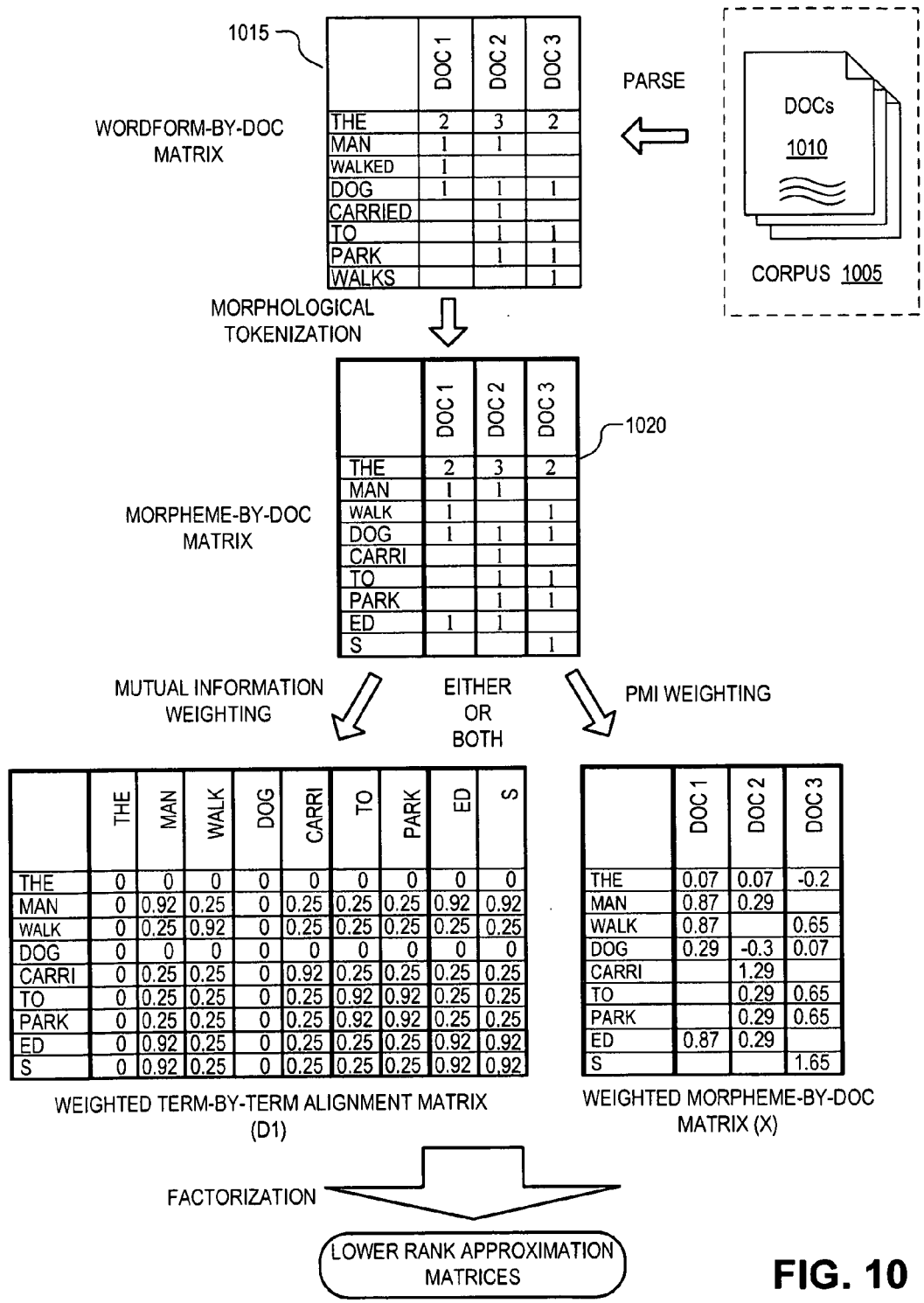
FIG. 10 is a flow diagram illustrating a framework for information retrieval, in accordance with an embodiment of the invention.

With reference to FIGS. 9 and 10, in order to perform IR on a corpus 1005 of documents 1010 a training phase 901 is first executed. Training phase 901 is a one time, fixed overhead for a given corpus. Once training phase 901 is completed for a given corpus, IR may be quickly and efficiently performed repeatedly on corpus 1005 during an IR runtime 902. If new documents are subsequently added to corpus 1005, then an abridged training phase may be reexecuted.

In a process block 905, a corpus is selected. As illustrated in FIG. 10, a corpus 1005 includes two or more documents 1010. In the case of a multilingual corpus, a first subset of documents 1010 may be used as training documents to aid IR on a second subset of documents 1010, which represent the target library documents to be searched (e.g., library of scientific articles, medical journals, etc.). For example, multiple foreign language translations of the Bible may be used as training documents to pull out statistical latent semantic correlations between the words of the foreign translations. The training documents are combined with the target library documents, which are the target documents to be searched during IR runtime phase 902. In essence, the multilingual Biblical text operates as a cross language cipher (e.g., multilingual Rosetta Stone) for performing IR on the library documents.

Once corpus 1005 is selected, it is parsed into individual wordforms to generate wordform-by-document matrix 1015 (process block 910). Wordform-by-document matrix 100 illustrated in FIG. 1 is an example of wordform-by-document matrix 1015. In a process block 915, wordform-by-document matrix 1015 is morphologically tokenized to generate morpheme-by-document matrix 1020 (e.g., morpheme-by-document matrix 300). In one embodiment, the morphological tokenization is an automated, unsupervised process using a program such as Linguistica. As discussed above, morphological tokenization may include stemming the wordforms and providing separate rows for the stems, prefixes, and suffixes. It should be appreciated that morphological tokenization is optional in process 900. Although morphological tokenization is believed to improve IR results, a weighting scheme could be applied directly to wordform-by-document matrix 1015.

If corpus 1005 is not a multilingual parallel corpus (decision block 920), then either PMI weighting or various other weighting schemes may be applied to morpheme-by-document matrix 1020. In a process block 925, PMI weighting is applied to morpheme-by-document matrix 1020 to generate a weighted morpheme-by-document matrix X (see FIG. 10). PMI weighting may be applied as described above in connection with FIG. 2. Alternatively, various other types of weighting schemes can be applied to generate weighted morpheme-by-document matrix X, including but not limited to, log-entropy weighting or any of the weighting schemes mentioned in Table 1 above.

Returning to decision block 920, if corpus 1005 is a multilingual parallel corpus, then a weighted term-by-term alignment matrix D1 is generated (process block 935), as discussed above in connection with FIGS. 5-8. In one embodiment, weighted term-by-term alignment matrix D1 is a weighted morpheme-by-morpheme alignment matrix. In one embodiment, weighted term-by-term alignment matrix D1 is a sparse matrix, though the dense matrix form may be used as well.

Once one or both of weighted morpheme-by-document matrix X or weighted term-by-term alignment matrix D1 have been generated, algebraic factorization is performed to generate lower rank approximation matrices (process block 940). Factorization is beneficial because in a large corpus, unfactorized matrices can be large, requiring vast sums of memory and processing power to manipulate. Factorization reduces the rank of weighted morpheme-by-document matrix X or weighted term-by-term alignment matrix D1 by filtering out less valuable statistical correlations in the matrices, often referred to as statistical noise. A number of factorizing techniques may be used to reduce the rank of weighted morpheme-by-document matrix X and/or weighted term-by-term alignment matrix D1. For example, linear (e.g., singular value decomposition and eigenvalue decomposition) or multilinear (e.g., PARAFAC, PARAFAC2) algebraic techniques to factorize and reduce matrixes and tensors may be applied.

FIG. 11 illustrates a singular value decomposition ("SVD") of weighted morpheme-by-document matrix X, in accordance with an embodiment of the invention. A detailed discussion of how SVD is computed on a matrix is beyond the scope of the present disclosure, but SVD in general is well known in the art of linear algebra. However, it is sufficient for the present disclosure to note that an SVD factorization of matrix X generates three matrices: a morpheme-by-concept matrix U, a singular values matrix S, and a document-by-concept matrix V. In practice, the ranks of U and V are both lower than weighted morpheme-by-document matrix X. Morpheme-by-concept matrix U relates concepts to terms or morphemes within corpus 1005 while document-by-concept matrix V relates concepts to particular documents 1010 within corpus 1005. Once matrices U and V are generated, they can be used to perform runtime information retrieval via term or concept searches on corpus 1005 (process block 945). Alternative to SVD factorization, eigenvalue decomposition (EVD) can be performed on an EVD block matrix equivalent $B_1$ (see FIG. 11). $B_1$ is a 2×2 block matrix with zero matrices along the diagonal and matrix X and its transpose matrix $X^T$ on the off-diagonal.

Figure 12:
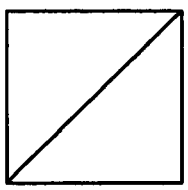
FIG. 12 illustrates an eigenvalue decomposition of a weighted term-by-term alignment matrix, in accordance with an embodiment of the invention.

FIG. 12 illustrates an EVD of weighted term-by-term alignment matrix D1, in accordance with an embodiment of the invention. A detailed discussion of how EVD is computed on a matrix is beyond the scope of the present disclosure, but EVD in general is well known in the art of linear algebra. However, it is sufficient for the present disclosure to note that an EVD factorization of a 2×2 block matrix $B_2$ (which includes weighted term-by-term alignment matrix D1 in the upper left position and all zeros in the remainder of the block matrix) generates two matrices: an eigenvector matrix and an eigenvalue matrix with the eigenvalues populated along the diagonal. The eigenvector matrix has a lower rank than weighted term-by-term alignment matrix D1. The eigenvector matrix is a morpheme-by-concept matrix which relates concepts to terms or morphemes within corpus 1005. Once the morpheme-by-concept matrix is generated, it can be used to perform runtime information retrieval via term or concept searches on corpus 1005 (process block 945).

Figure 13:
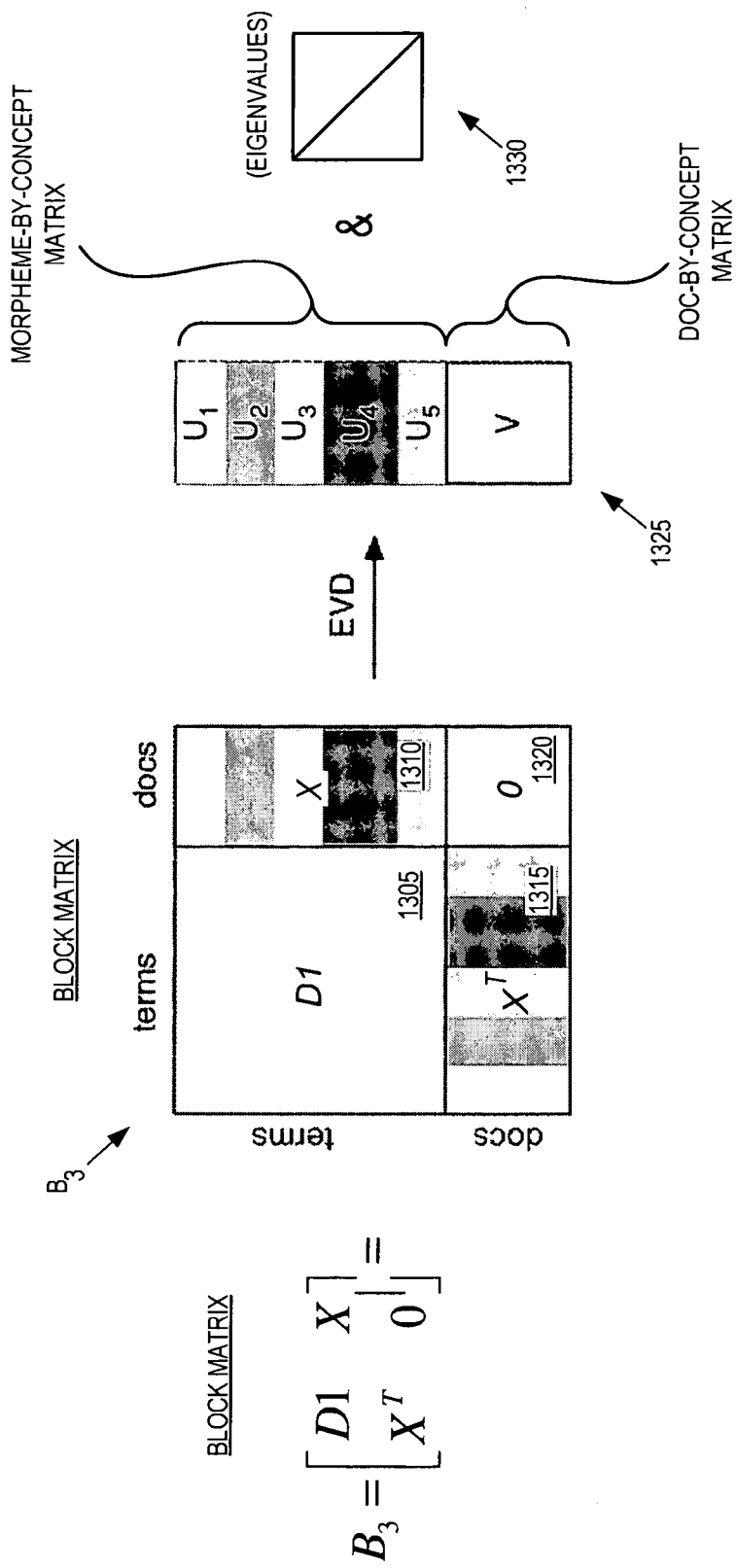
FIG. 13 illustrates an eigenvalue decomposition of a block matrix, in accordance with an embodiment of the invention.

FIG. 13 illustrates an EVD of a block matrix $B_3$, in accordance with an embodiment of the invention. Block matrix $B_3$ is a 2×2 matrix including both weighted term-by-term alignment matrix D1 and weighted morpheme-by-document matrix X. As illustrated, matrix D1 is positioned in the upper left portion 1305 of block matrix $B_3$, matrix X is positioned in the upper right portion 1310, the transpose of matrix X is position in the lower left portion 1315, and the lower right portion 1320 is populated with zeros. Performing an EVD factorization of block matrix $B_3$ generates a first factorized matrix 1325 and a second factorized matrix 1330. Factorized matrix 1325 includes morpheme-by-concept vectors $U_n$ stacked on top of document-by-concept vectors V. Factorized matrix 1330 includes eigenvalues along its diagonal. The morpheme-by-concept matrix and document-by-concept matrix each have lower ranks than D1 or X. As mentioned above, morpheme-by-concept matrix U relates concepts to terms or morphemes within corpus 1005 while document-by-concept matrix relates concepts to particular documents 1010 within corpus 1005. Once matrices U and V are generated, they can be used to perform runtime information retrieval via term or concept searches on corpus 1005 (process block 945).

As mentioned above, training phase 901 is a one-time cost, which can be automated and executed in an unsupervised fashion. Once the morpheme-by-concept matrix and/or document-by-concept matrix have been generated for a particular corpus 1005, IR runtime phase 902 is largely a matter of token-matching and simple arithmetic for information retrieval from corpus 1005.

Figure 14:
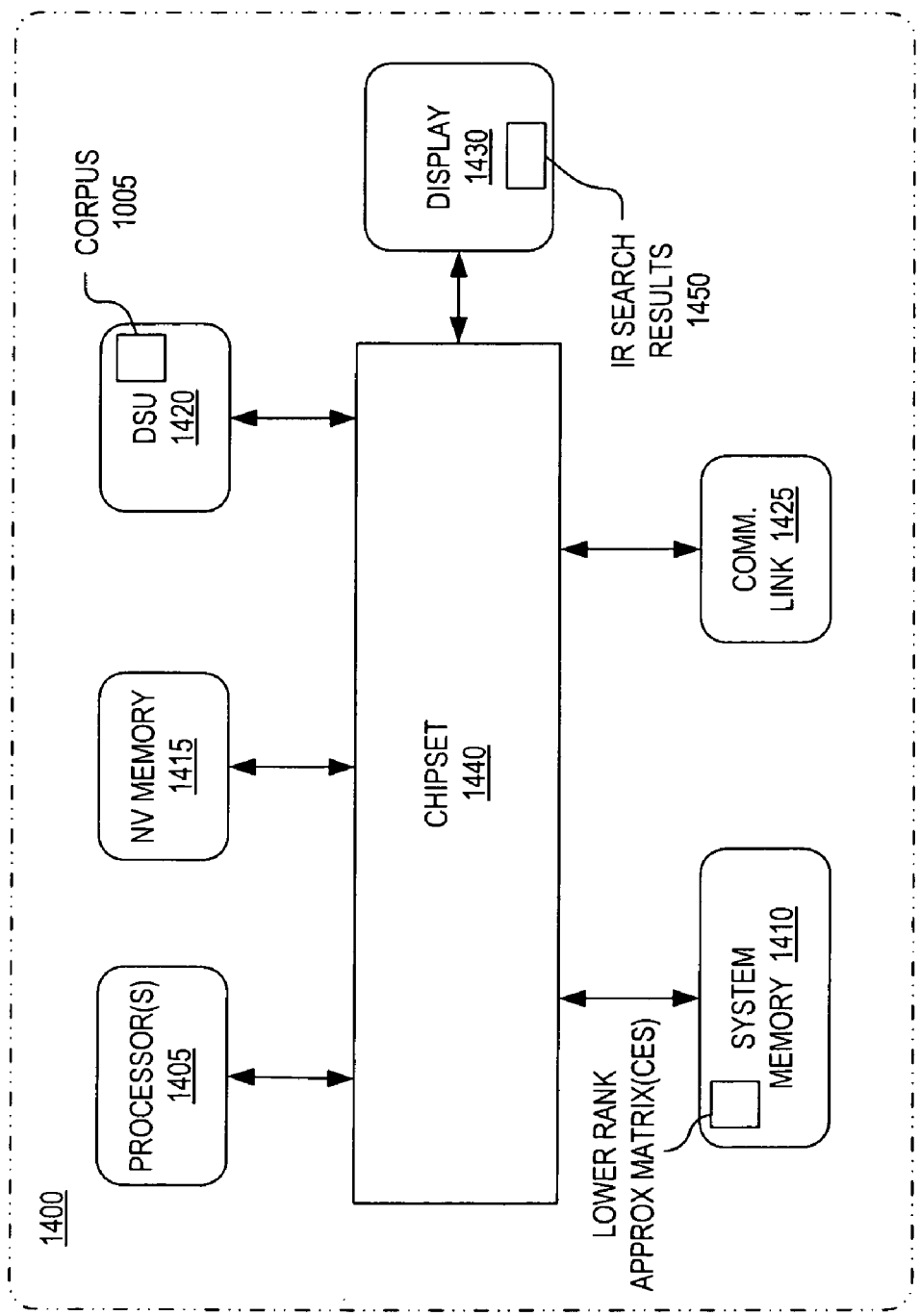
FIG. 14 is a block diagram illustrating a demonstrative processing system to store and execute embodiments of the invention thereon.

FIG. 14 is a block diagram illustrating a demonstrative processing system 1400 for executing embodiments of the invention described above. The illustrated embodiment of processing system 1400 includes one or more processors (or central processing units) 1405, system memory 1410, non-volatile ("NV") memory 1415, a data storage unit ("DSU") 1420, a communication link 1425, a display 1430, and a chipset 1440. The illustrated processing system 1400 may represent any computing system including a desktop computer, a notebook computer, a workstation, a handheld computer, a server, a blade, or the like. As illustrated, corpus 1005 may be stored in DSU 1420 while the lower rank approximation matrix(ces) may be stored in system memory 1410 during runtime and IR search results 1450 rendered to display 1430 for review by a user.

The elements of processing system 1400 are interconnected as follows. Processor(s) 1405 is communicatively coupled to system memory 1410, NV memory 1415, DSU 1420, and communication link 1425, via chipset 1440 to send and to receive instructions or data thereto/therefrom. In one embodiment, NV memory 1415 is a flash memory device. In other embodiments, NV memory 1415 includes any one of read only memory ("ROM"), programmable ROM, erasable programmable ROM, electrically erasable programmable ROM, or the like. In one embodiment, system memory 1410 includes random access memory ("RAM"), such as dynamic RAM ("DRAM"), synchronous DRAM ("SDRAM"), double data rate SDRAM ("DDR SDRAM"), static RAM ("SRAM"), or the like. DSU 1420 represents any storage device for software data, applications, and/or operating systems, but will most typically be a nonvolatile storage device. DSU 1420 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1420 is illustrated as internal to processing system 1400, DSU 1420 may be externally coupled to processing system 1400. Communication link 1425 may couple processing system 1400 to a network such that processing system 1400 may communicate over the network with one or more other computers. Communication link 1425 may include a modem, an Ethernet card, a Gigabit Ethernet card, Universal Serial Bus ("USB") port, a wireless network interface card, a fiber optic interface, or the like. Display unit 1430 may be coupled to chipset 1440 via a graphics card and renders images for viewing by a user.

It should be appreciated that various other elements of processing system 1400 may have been excluded from FIG. 14 and this discussion for the purposes of clarity. Chipset 1440 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1440. Correspondingly, processing system 1400 may operate without one or more of the elements illustrated. For example, processing system 1400 need not include DSU 1420.

The processes explained above are described in terms of computer software and hardware. The techniques described may constitute computer-executable instructions embodied or stored within a machine-readable storage medium, that when executed by a machine will cause the machine (e.g., computer, processor, etc.) to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method of information retrieval, comprising:
    parsing a corpus to identify instances of wordforms within each document of the corpus;
    performing a morphological tokenization on the wordforms to convert the wordforms into morphemes by separating affixes from their stems;
    generating a morpheme-by-document matrix based at least in part on a number of instances of the affixes and the stems within each document of the corpus, wherein the morpheme-by-document matrix accounts for information related to past tense and present tense inflections by separately enumerating the instances of the affixes from the instances of the stems;
    applying a weighting function to attribute-values within the morpheme-by-document matrix to generate a weighted morpheme-by-document matrix, wherein applying the weighting function includes:
        applying the weighting function to the attribute-values of the stems; and
        applying the weighting function to the attribute-values of the affixes separately from the attribute-values of the stems to separately account for relative importance of the affixes;
    generating at least one lower rank approximation matrix by factorizing the weighted morpheme-by-document matrix; and
    retrieving information with reference to the at least one lower rank approximation matrix.

2. The computer implemented method of claim 1, wherein the corpus is stored within a computer accessible storage, and wherein retrieving the information comprises:
    searching for information in the corpus with reference to the at least one lower rank approximation matrix; and
    rendering the information as search results to a display.

3. The computer implemented method of claim 1, wherein generating the at least one lower rank approximation matrix by factorizing the weighted morpheme-by-document matrix comprises:
    performing a singular value decomposition (SVD) on the weighted morpheme-by-document matrix;
    generating a morpheme-by-concept matrix; and
    generating a document-by-concept matrix.

4. A computer implemented method of claim 1, wherein the weighting function comprises a pointwise mutual information (PMI) weighting function according to the following relation:

$$w(i, j) = \log\left(\frac{p(i, j)}{p(i)p(j)}\right),$$

where i represents a term variable, j represents a document variable, w(i,j) represents a weighted attribute value populated in cell(i,j) of the morpheme-by-document matrix, p(i,j) represents a random probability of selecting term i from document j, p(j) represents a random probability of selecting any term from document j, and p(i) represents a random probability of selecting term i from the corpus.

5. The computer implemented method of claim 1, further comprising:
    generating a term-by-term alignment matrix based on the morpheme-by-document matrix; and
    applying a second weighting function to the term-by-term alignment matrix to generate a weighted term-by-term alignment matrix.

6. The computer implemented method of claim 5 wherein the second weighting function comprises a mutual information weighting function according to the following relation:

$$I(A; B) = \left(\frac{r+s}{N}\log\frac{r+s}{N} + \frac{t+u}{N}\log\frac{t+u}{N}\right) + \left(\frac{r+t}{N}\log\frac{r+t}{N} + \frac{s+u}{N}\log\frac{s+u}{N}\right) - \left(\frac{r}{N}\log\frac{r}{N} + \frac{s}{N}\log\frac{s}{N} + \frac{t}{N}\log\frac{t}{N} + \frac{u}{N}\log\frac{u}{N}\right)$$

where I(A;B) represents the mutual information of a term A and a term B, A represents the term A, B represents the term B, r represents a number of documents in the corpus that contain both the term A and the term B, s represents a number of documents in the corpus that contain the term A but not the term B, t represents a number of documents in the corpus that contain the term B but not the term A, u represents a number of documents in the corpus that contain neither the term B nor the term A, and N represents a total number of documents in the corpus.

7. The computer implemented method of claim 5, wherein generating at least one lower rank approximation matrix by factorizing the weighted morpheme-by-document matrix comprises:
    combining the weighted term-by-term alignment matrix and the weighted morpheme-by-document matrix into a block matrix; and
    performing an eigenvalue decomposition ("EVD") on the block matrix, wherein a first portion of eigenvectors obtained from the EVD comprise morpheme-by-concept vectors and a second portion of the EVD comprise document-by-concept vectors.

8. The computer implemented method of claim 5, wherein the corpus includes multilingual documents.

9. The computer implemented method of claim 8, wherein a first portion of the corpus includes at least two language translations of Biblical text and a second portion of the corpus includes multilingual non-Biblical documents, the method further comprising:
   using the first portion of the corpus as a cross language cipher for performing multilingual information retrieval on the second portion of the corpus.

10. The computer implemented method of claim 1, further comprising:
   generating a wordform-by-document matrix based on the instances of the wordforms within each document of the corpus; and
   generating the morpheme-by-document matrix based on the wordform-by-document matrix.

11. A computer implemented method of information retrieval, comprising:
   parsing a corpus to identify instances of wordforms within each document of the corpus;
   performing a morphological tokenization on the wordforms to convert the wordforms into morphemes by separating affixes from their stems;
   generating a morpheme-by-document matrix based at least in part on a number of instances of the affixes and the stems within each document of the corpus, wherein the morpheme-by-document matrix accounts for information related to past tense and present tense inflections by separately enumerating the instances of the affixes from the instances of the stems;
   generating a term-by-term alignment matrix based at least in part on the number of instances of the affixes and the stems within each document of the corpus and the morpheme-by-document matrix; and
   generating at least one lower rank approximation matrix by factorizing the term-by-term alignment matrix.

12. The computer implemented method of claim 11, wherein the corpus is stored within a computer accessible storage, the method further comprising:
   searching for information in the corpus with reference to the at least one lower rank approximation matrix;
   retrieving the information from the corpus; and
   rendering the information to a display.

13. The computer implemented method of claim 11, wherein the corpus includes multilingual documents that are translations of each other.

14. The computer implemented method of claim 11, wherein generating the term-by-term alignment matrix comprises:
   determining a dense term-by-term alignment matrix having nonzero attribute values within a majority of cells within the dense term-by-term alignment matrix;
   identifying largest nonzero attribute values within sections of the dense term-by-term alignment matrix; and
   generating a sparse term-by-term alignment matrix by setting other nonzero attribute values within each of the sections of the dense term-by-term alignment matrix to zero.

15. The computer implemented method of claim 11, wherein the term-by-term alignment matrix comprises a weighted term-by-term alignment matrix.

16. The computer implemented method of claim 15, wherein the term-by-term alignment matrix comprises a two dimensional matrix aligning terms within the corpus along columns and rows of the two dimensional matrix, wherein the attribute values within cells of the two dimensional matrix represent latent statistical relations between the terms.

17. The computer implemented method of claim 16, wherein the attribute values comprise mutual information between the terms according to the following relation:

$$I(A; B) = \left(\frac{r+s}{N}\log\frac{r+s}{N} + \frac{t+u}{N}\log\frac{t+u}{N}\right) + \left(\frac{r+t}{N}\log\frac{r+t}{N} + \frac{s+u}{N}\log\frac{s+u}{N}\right) - \left(\frac{r}{N}\log\frac{r}{N} + \frac{s}{N}\log\frac{s}{N} + \frac{t}{N}\log\frac{t}{N} + \frac{u}{N}\log\frac{u}{N}\right)$$

where I(A;B) represents the mutual information of a term A and a term B, A represents the term A, B represents the term B, r represents a number of documents in the corpus that contain both the term A and the term B, s represents a number of documents in the corpus that contain the term A but not the term B, t represents a number of documents in the corpus that contain the term B but not the term A, u represents a number of documents in the corpus that contain neither the term B nor the term A, and N represents a total number of documents in the corpus.

18. The computer implemented method of claim 11, wherein generating the at least one lower rank approximation matrix by factorizing the term-by-term alignment matrix comprises:
   performing an eigenvalue decomposition of the term-by-term alignment matrix; and
   generating term-by-concept matrix based on the eigenvalue decomposition.

19. The computer implemented method of claim 11, further comprising generating a term-by-document matrix based at least in part on the number of instances of the affixes and the stems within each document of the corpus, and wherein generating the at least one lower rank approximation matrix by factorizing the term-by-term alignment matrix comprises:
   inserting the term-by-term alignment matrix, the term-by-document matrix, and a transpose of the term-by-document matrix into a block matrix; and
   performing an eigenvalue decomposition of the block matrix to generate a morpheme-by-concept matrix and a document-by-concept matrix.

20. A computer-readable storage medium that provides instructions that, when executed by a computer, will cause the computer to perform operations comprising:
   parsing a corpus to identify instances of wordforms within each document of the corpus;
   performing a morphological tokenization on the wordforms to convert the wordforms into morphemes by separating affixes from their stems;
   generating a weighted morpheme-by-document matrix based at least in part on a number of instances of the affixes and the stems within each document of the corpus and based at least in part on a weighting function, wherein the weighted morpheme-by-document matrix accounts for information related to past tense and present tense inflections by separately enumerating the instances of the affixes from the instances of the stems, wherein the weighting function is applied to attribute-values of the affixes separately form attribute-values of the stems to separately account for relative importance of the affixes; and generating at least one lower rank approximation matrix by factorizing the weighted morpheme-by-document matrix.

21. The computer-readable storage medium of claim 20, further providing instructions that, when executed by the computer, will cause the computer to perform further operations, comprising:
   searching for information in the corpus with reference to the at least one lower rank approximation matrix, wherein the corpus is stored in a database;
   retrieving the information from the corpus; and
   rendering the information as search results to a display coupled to the computer.

22. The computer-readable storage medium of claim 20, wherein generating the at least one lower rank approximation matrix by factorizing the weighted morpheme-by-document matrix comprises:
   performing a singular value decomposition (SVD) on the weighted morpheme-by-document matrix;
   generating a morpheme-by-concept matrix; and
   generating a document-by-concept matrix.

23. The computer-readable storage medium of claim 20, wherein the weighting function comprises a pointwise mutual information (PMI) weighting function according to the following relation:

$$w(i, j) = \log\left(\frac{p(i, j)}{p(i)p(j)}\right),$$

where i represents a term variable, j represents a document variable, w(i,j) represents a weighted attribute value populated in cell(i,j) of the morpheme-by-document matrix, p(i,j) represents a random probability of selecting term i from document j, p(j) represents a random probability of selecting any term from document j, and p(i) represents a random probability of selecting term i from the corpus.

24. The computer-readable storage medium of claim 20, further providing instructions that, when executed by the computer, will cause the computer to perform further operations, comprising:
   generating a term-by-term alignment matrix based on the morpheme-by-document matrix; and
   applying a second weighting function to the term-by-term alignment matrix to generate a weighted term-by-term alignment matrix.

25. The computer-readable storage medium of claim 24 wherein the second weighting function comprises a mutual information weighting function according to the following relation:

$$I(A; B) = \left(\frac{r+s}{N}\log\frac{r+s}{N} + \frac{t+u}{N}\log\frac{t+u}{N}\right) + \left(\frac{r+t}{N}\log\frac{r+t}{N} + \frac{s+u}{N}\log\frac{s+u}{N}\right) - \left(\frac{r}{N}\log\frac{r}{N} + \frac{s}{N}\log\frac{s}{N} + \frac{t}{N}\log\frac{t}{N} + \frac{u}{N}\log\frac{u}{N}\right)$$

where I(A;B) represents the mutual information of a term A and a term B, A represents the term A, B represents the term B, r represents a number of documents in the corpus that contain both the term A and the term B, s represents a number of documents in the corpus that contain the term A but not the term B, t represents a number of documents in the corpus that contain the term B but not the term A, u represents a number of documents in the corpus that contain neither the term B nor the term A, and N represents a total number of documents in the corpus.

26. The computer-readable storage medium of claim 24, wherein generating at least one lower rank approximation matrix by factorizing the weighted morpheme-by-document matrix comprises:
   combining the weighted term-by-term alignment matrix and the weighted morpheme-by-document matrix into a block matrix; and
   performing an eigenvalue decomposition ("EVD") on the block matrix, wherein a first portion of eigenvectors obtained from the EVD comprise morpheme-by-concept vectors and a second portion of the EVD comprise document-by-concept vectors.

* * * * *